United States Patent
Fang et al.

(10) Patent No.: US 7,558,760 B2
(45) Date of Patent: Jul. 7, 2009

(54) REAL-TIME KEY FRAME GENERATION

(75) Inventors: Nicholas J Fang, Redmond, WA (US); Ashley C Speicher, Redmond, WA (US); Todd Bowra, Redmond, WA (US); Sudhakar V Prabhu, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 54 days.

(21) Appl. No.: 11/761,519

(22) Filed: Jun. 12, 2007

(65) Prior Publication Data

US 2008/0310496 A1     Dec. 18, 2008

(51) Int. Cl.
*G06F 17/60* (2006.01)
(52) U.S. Cl. ............................. 705/57; 705/50; 705/51
(58) Field of Classification Search ................ 705/57, 705/50, 51
See application file for complete search history.

(56) References Cited

U.S. PATENT DOCUMENTS

| | | | | |
|---|---|---|---|---|
| 5,991,403 | A | * | 11/1999 | Aucsmith et al. ........... 380/217 |
| 6,021,250 | A | * | 2/2000 | Hyodo et al. ............... 386/95 |
| 6,097,842 | A | * | 8/2000 | Suzuki et al. ............... 382/232 |
| 6,122,433 | A | | 9/2000 | McLaren |
| 2001/0020981 | A1 | | 9/2001 | Jun et al. |
| 2002/0130976 | A1 | | 9/2002 | Gutta et al. |
| 2004/0268397 | A1 | | 12/2004 | Dunbar et al. |
| 2005/0114909 | A1 | | 5/2005 | Mercier |
| 2006/0090009 | A1 | | 4/2006 | Gopalakrishnan et al. |
| 2007/0011343 | A1 | | 1/2007 | Davis et al. |
| 2007/0058926 | A1 | | 3/2007 | Virdi et al. |

FOREIGN PATENT DOCUMENTS

JP         405236466 A  *  9/1993

OTHER PUBLICATIONS

Zhuang et al., "Adaptive Key Frame Extraction Using Unsupervised Clustering", IEEE, 1998, pp. 1-5.
Girgensohn et al., "Keyframe-Based User Interfaces for Digital Video", IEEE, 2001, pp. 61-67.
Ferreira, "Optimizing Microsoft Windows Media Services 9 Series", Microsoft Windows Digital Media Division, Mar. 2005, pp. 1-54.
Ho et al., "A Rate-Constrained Key-Frame Extraction Scheme For Channel-Aware Video Streaming", vol. 1, IEEE, Oct. 24-27, 2004, pp. 613-616.

* cited by examiner

*Primary Examiner*—Pierre E Elisca
(74) *Attorney, Agent, or Firm*—Alleman Hall McCoy Russell & Tuttle LLP

(57) ABSTRACT

The real-time generation of key frames in a media data stream is disclosed. One embodiment provides a method of processing encoded media data comprising receiving a request to play back the encoded media data from a media receiver, generating one or more key frames from the encoded media data, and sending the generated key frame or key frames to the media receiver. The key frames are generated by decoding the media data, and then encoding the key frames from the decoded media data. In this manner, a frequency of key frames in a media data stream may be increased to improve trick mode and 1× playback.

20 Claims, 4 Drawing Sheets

REAL-TIME KEY FRAME GENERATION

BACKGROUND

Media data may be encoded in a number of different formats. Some formats, including but not limited to MPEG 1, MPEG-2, and MPEG-4 (all standardized by the Motion Picture Experts Group ("MPEG")), as well as Windows Media Video (WMV) (developed by Microsoft Corporation of Redmond, Wash.) and H.264, encode media data using both independent and predictive data frames. Independent data frames, or "key frames", are self-contained in that a key frame is encoded without reference to any other data frames. In contrast, a predictive data frame encodes differences between that frame and previous and/or later data frames.

Because key frames may be decoded without reference to other data frames, they may be used as reference frames in digital media playback "trick modes", such as fast-forward, rewind, and seek operations, to seed the decoding of related progressive frames. For example, some media players may implement high speed fast-forward and rewind playback of a media data stream by playing only key frames.

Because predictive frames generally offer a greater compression ratio than key frames, some media files utilize a lower density of key frames to decrease the bit rate, and consequently the overall size, of the file. However, as the frequency of key frames decreases, the similarities between adjacent key frames also may decrease and/or the overall frame-rate decreases. This may cause trick-mode playback to become choppier. As a result, some media data streams may have too few key frames for trick playback modes to work well. As a specific example, the playback of a video data stream with one key frame for every eight seconds of media data in an 8× (i.e. 8 times normal playback speed) fast-forward or rewind mode would result in the display of one frame per second. Likewise, playback of such a file in a 4× playback mode would result in the display of one frame every two seconds. Such playback may resemble a slide show of relatively unrelated images, rather than high-speed playback of a complete video scene.

Further, some media compression standards, such as MPEG-2, may provide for the creation of syntactically valid media data streams that have no key frames at all. Some streaming media sources, such as various international television stations, may encode video streams in such a manner to reduce the overall bit rate of the stream. As a result, these streams may not be playable with full trick-mode functionality on some players. Furthermore, because of the relative obscurity of this portion of the MPEG-2 specification, some decoders may not be configured to play such streams even at normal playback speed ("1× playback").

SUMMARY

Accordingly, the real-time generation of key frames in a media data stream is described below in the Detailed Description. For example, one disclosed embodiment provides a method for processing encoded media data comprising receiving a request to play back the encoded media data from a media receiver, generating one or more key frames from the encoded media data on the media server, and sending the generated key frame or key frames to the media receiver. The key frames are generated by decoding the media data, and then encoding the key frames from the decoded media data. In this manner, the frequency of key frames in a media data stream may be increased to improve trick mode and/or 1× playback.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
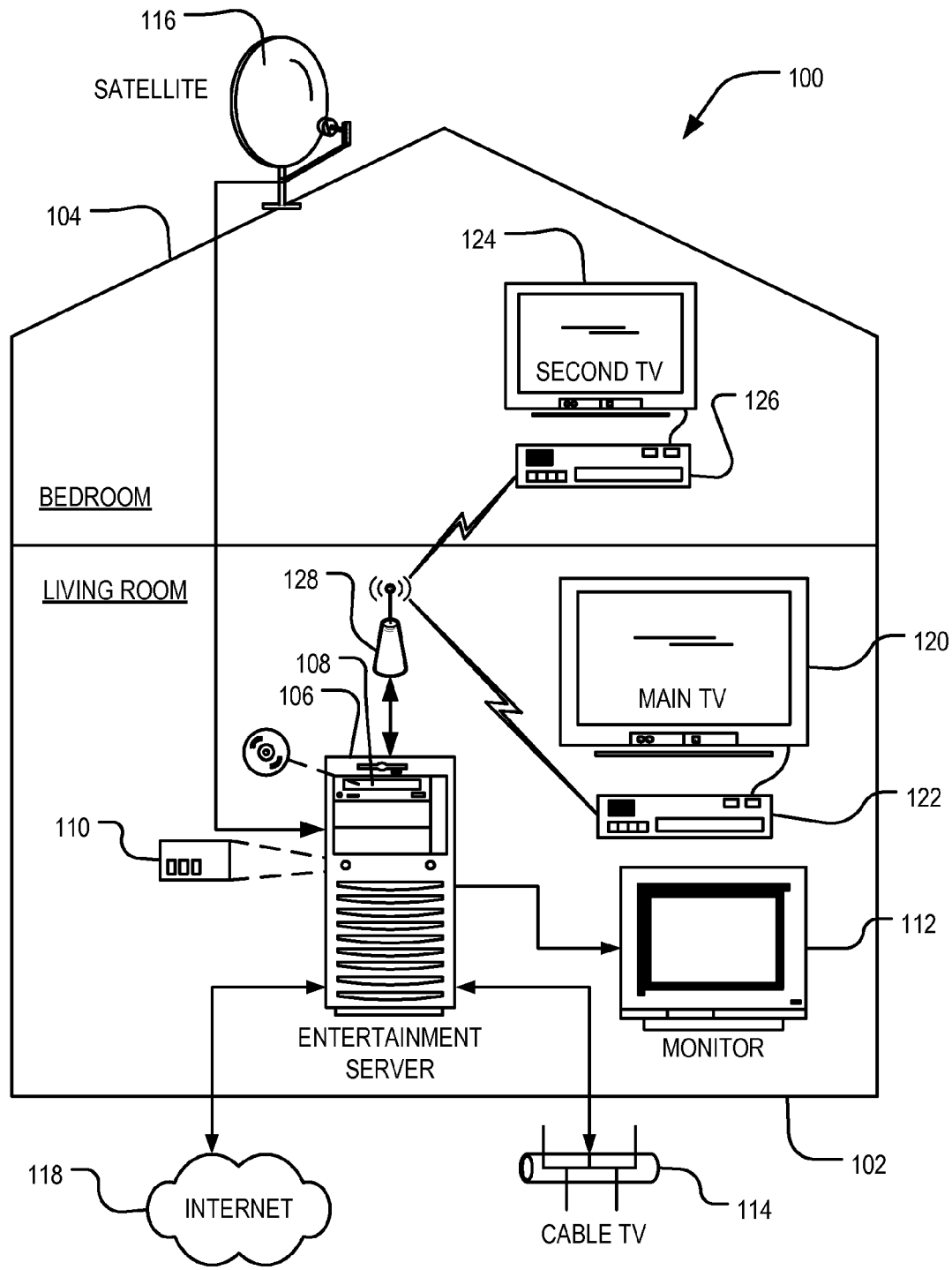
FIG. 1 shows an example of an embodiment of a home media environment.

Prior to discussing the real-time generation of key frames in streaming media data, one embodiment of a streaming media environment is described. FIG. 1 depicts an example home entertainment environment 100 including a living room 102 and a bedroom 104. Central to the home entertainment environment 100 is a media server 106, which in this implementation situated in the living room 102, but which could be located anywhere within the house. In this implementation, the media server 106 is a conventional personal computer (PC) configured to run a multimedia software package, for example, the Windows Vista Ultimate operating system with Windows Media Center (available from Microsoft Corporation of Redmond, Wash.). In such a configuration, the media server 106 is able to integrate full computing functionality with a complete home entertainment system into a single PC. For example, a user can watch television (TV) in one graphical window of a video monitor, while sending e-mail or working on a spreadsheet in another graphical window on the same monitor. In addition, the media server 106 may also include other features or components, for example: a digital video recorder (DVR) to capture live TV shows for future viewing or to record the future broadcast of a single program or series; a compact disc (CD) or digital video disc (DVD) drive 108 for disc media playback; a memory drive 110 for integrated storage of and access to a user's recorded content, such as TV shows, songs, pictures, and home videos; and an electronic program guide (EPG) (not shown in FIG. 1).

Instead of a conventional PC, the media server 106 may comprise a variety of other devices capable of storing and distributing media content including, for example, a notebook or portable computer, a tablet PC, a workstation, a mainframe computer, a server, an Internet appliance, or combinations thereof. The media server 106 may also be a set-top box capable of delivering media content to a computer where it may be streamed, or the set-top box itself could stream the media content. As the media server 106 may be a full function computer running an operating system, the user may also have the option to run standard computer programs (e.g., word processing and spreadsheets), send and receive e-mails, browse the Internet, or perform other common functions.

In addition to storing media content, the media server 106 may be connected with a variety of media sources, for example, a cable connection 114, a satellite receiver 116, an antenna (not shown for the sake of graphic clarity), and/or a network such as the Internet 118. A user may thus control a live stream of media content (e.g., TV content) received, for example, via the cable connection 114, the satellite receiver 116, or antenna. This capability is enabled by one or more tuners residing in the media server 106. The one or more tuners may alternatively be located remote from the media server 106. In either case, the user may choose a tuner to fit any particular preferences. For example, a user wishing to watch both standard definition (SD) and high definition (HD) content may employ a tuner configured for both types of content. Alternately, the user may employ an SD tuner for SD content and an HD tuner for HD content separately.

The home environment 100 may also include one or more network devices functioning as media receivers 122, 126 placed in communication with the media server 106 through a network 128, for example, a local area network (LAN). In an example embodiment, each media receiver 122, 126 may be a Media Center Extender device, for example, an Xbox 360™ (Microsoft Corporation, Redmond, Wash.). The media receivers 122, 126 may also be implemented as any of a variety of conventional media rendering or computing devices, including, for example, a set-top box, a television, a video gaming console, a desktop PC, a notebook or portable computer, a workstation, a mainframe computer, an Internet appliance, a handheld PC, a cellular telephone or other wireless communications device, a personal digital assistant (PDA), or combinations thereof. Furthermore, the media receivers 122, 126 may include a tuner as described above.

The network 128 may comprise a wired and/or wireless network, for example, cable, Ethernet, WiFi, a wireless access point (WAP), or any other electronic coupling means, including the Internet. The network 128 may enable communication between the media server 106, the media receivers 122, 126, and any other connected device through packet-based communication protocols, such as Transmission Control Protocol (TCP), Internet Protocol (IP), Real-time Transport Protocol (RTP), and Real-time Transport Control Protocol (RTCP). Communications may be transmitted directly between devices over a LAN, or they may be carried over a wide area network (WAN), for example, the Internet 118.

One or more video display devices, for example a main TV 120 in the living room 102, a secondary TV 124 in the bedroom 104, and a video monitor 112 may be situated throughout the home environment 100. These video display devices may be connected with the media server 106 via the network 128 either directly or via the media receivers 122, 126. As shown in the example of FIG. 1, the main TV 120 and the secondary TV 124 may be coupled to the media receivers 122, 126 through conventional cables. The video monitor 112 may be coupled with the media server 106 directly via a video cable. The media server 106 and media receivers 122, 126 may also or alternatively be coupled with any of a variety of video and audio presentation devices. Media content including TV content may thus be supplied to each of the video display devices 112, 120, 124 over the home network 128 from the media server 106 situated in the living room 104.

The media receivers 122, 126 may be configured to receive streamed media content, including video and TV content, from the media server 106. Media content, and particularly video and TV content, may be transmitted from the media server 106 to the media receivers 122, 126 as streaming media comprised of discrete content packets via any of the network protocols described above. The streamed media content may comprise IPTV (television content delivered over an Internet Protocol (IP)-based network), Standard Definition (SD), and High Definition (HD) content, including video, audio, and image files, decoded on the media receivers 122, 126 for presentation on the connected TVs 120, 124. The media content may further be "mixed" with additional content, for example, an EPG, presentation content related to the media content, a web browser window, and other user interface environments transmitted from the media server for output on the TVs 120, 124 or the monitor 112. Such additional media content may be delivered in a variety of ways using different protocols, including, for example, standard Remote Desktop Protocol (RDP), Graphics Device Interface (GDI), or Hypertext Markup Language (HTML).

Media receivers 122, 126 may be configured not only to play media streams at 1×, but also to operate in trick modes, such as fast-forward, rewind, and seeks. As described above, some media receivers rely on the presence of key frames in an audio and/or video data stream for proper operation in trick modes. For example, some media receivers may support some trick modes, such as high-speed rewind and fast-forward, by playing only key frames. However, some media streams may have a relatively low density of key frames. As a result, trick-mode playback of these streams may appear choppy. Where the density of key frames is very low, the playback frame-rate will consequently be low, and trick mode playback of a video file, for example, may resemble a slide-show of relatively unrelated images, and therefore may not allow a user to track the action in a scene. This may reduce the usability of trick-mode operation, and also may decrease a user's enjoyment of the trick-mode playback experience. Examples of formats that utilize key frames include, but are not limited to, MPEG-1, MPEG-2, MPEG-4, H.264, and WMV.

Further, some media streams may include only predictive frames and no key frames, even though the compression standard utilized provides a way to encode both key frames and predictive frames. An example of this is MPEG-2, which provides a way to encode both predictive frames and key frames, but that also allows for the encoding of data purely with predictive frames. With such media streams, a media receiver that implements trick-mode playback via key frames may not properly function in trick modes. Furthermore, because this portion of the MPEG-2 specification is not widely used or implemented, some media receivers may not be able to play such media streams properly, even at 1× playback.

To enable or improve trick mode operation (and, in some players, 1× operation) with media streams having either a low density of key frames or no key frames, media server 106 may be configured to generate key frames for the media data, and to send the generated key frames to media receivers 122, 126 along with a stream of the original media data file. This may allow media receivers 122, 126 to play these media streams properly and with full trick-mode functionality.

Prior to discussing these embodiments in detail, it will be appreciated that the embodiments described herein may be implemented, for example, via computer-executable instructions or code, such as programs, stored on a computer-readable storage medium and executed by a computing device. Generally, programs include routines, objects, components, data structures, and the like that perform particular tasks or implement particular abstract data types. The term "program" as used herein may connote a single program or multiple programs acting in concert, and may be used to denote applications, services, or any other type or class of program. Likewise, the terms "computer" and "computing device" as used herein include any device that electronically executes one or more programs, including but not limited to media server 106, media receivers 122, 126, and any other suitable device such as personal computers, servers, laptop computers, hand-held devices, cellular phones, microprocessor-based programmable consumer electronics and/or appliances, routers, gateways, hubs and other computer networking devices.

Figure 2:
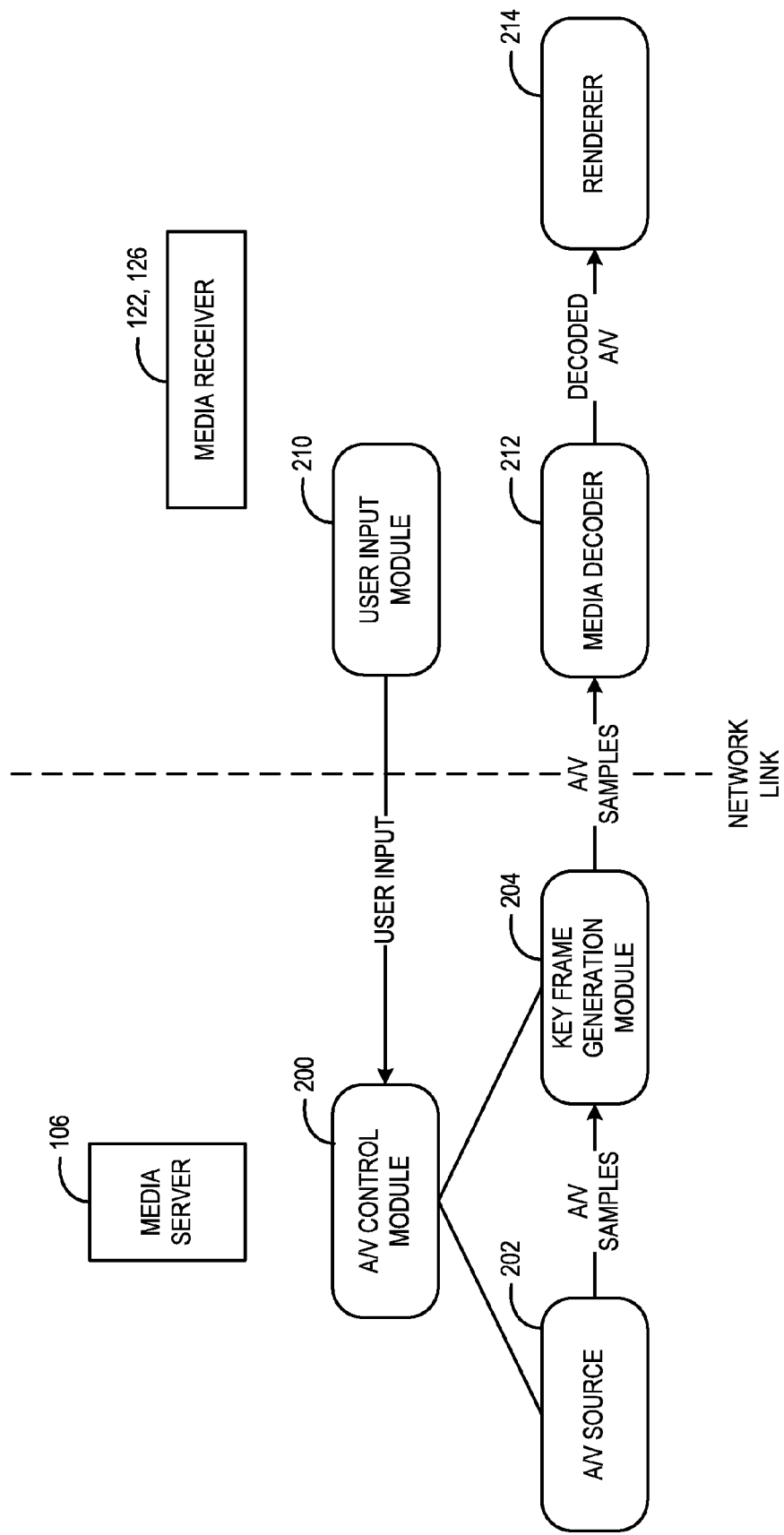
FIG. 2 shows a block diagram depicting embodiments of a media server and a media receiver of the embodiment of FIG. 1.

FIG. 2 is a block diagram showing an embodiment of media server 106 and an embodiment of one of media receivers 122, 126, and illustrates various functional components of these devices related to trick-mode operation and/or real-time key frame generation. Media server 106 comprises an A/V control module 200, an A/V source 202, and a real-time key frame generation module 204. The A/V control module 200 may be configured to determine when a key frame is to be constructed, and what data to use to generate the key frame. The A/V source 202 sources A/V media samples from a media source such as a hard drive, optical disc, network, or any other suitable media source. The real-time key frame generation module 204 generates key frames under the direction of A/V control module 200 by decoding selected data received from the A/V source, thereby providing sufficient context to generate a key frame. Various embodiments of methods for generating key frames are described in more detail below.

Continuing with FIG. 2, media receivers 122, 126 each comprise a user input module 210, a media decoder 212, and a renderer 214. The user input module 210 allows users to input commands related to the selection and playback of media, including but not limited to trick-mode commands. The media decoder 212 decodes media samples for the current playback position before passing decoded A/V information to the renderer 214 for presentation.

Figure 3:
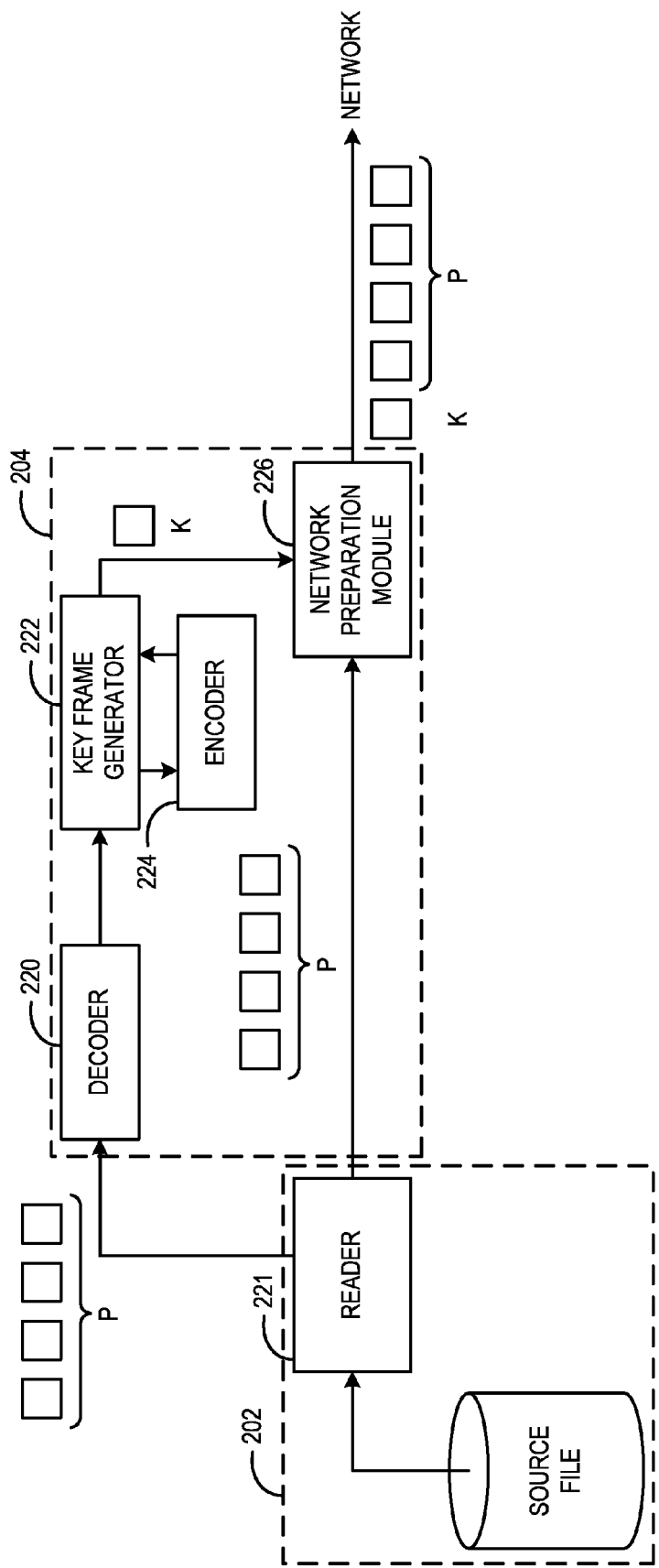
FIG. 3 shows a block diagram of an embodiment of a key frame generator of the media server of FIG. 1.

FIG. 3 shows a block diagram of one embodiment of a key frame generation module 204. In the embodiment of FIG. 3, key frame generation module 204 comprises a decoder 220 that receives data from a media data reader 221 in A/V source 202. This data is illustrated in FIG. 3 as a stream of predictive data frames (labeled "P"). Key frame generation module 204 further includes a key frame generator 222 that receives decoded media data from the decoder 220, and an encoder 224 that receives decoded data from the key frame generator 222 and generates an encoded key frame. The key frame generator 222 also sends generated key frames (labeled "K") to a network preparation module 226 for insertion into a media stream for transmission to a media receiver over a network.

Data may be provided to the decoder 220 continuously, or on an as-needed basis. Where it is desired to generate key frames on a fairly frequent basis (for example, to enable a media stream containing no key frames or a low frequency of key frames to operate smoothly at slow trick mode speeds), data may be provided to the decoder 220 on a continuous basis so that the key frame generator 222 has sufficient context to generate key frames at the desired frequency. On the other hand, where it is desired only to enable a seek operation, rather than fast-forward or rewind modes, data may be provided to the decoder only upon receipt of a seek command. In this case, data immediately preceding the requested seek point may be provided to the decoder 220 so that the key frame generator 222 has sufficient context to construct a seed key frame at the requested seek point for the rendering of an image at the seek point.

It will be noted that, in the embodiment of FIG. 3, data from the media data reader 221 is sent directly to the network preparation module 226 at the same time it is sent to decoder. This is illustrated in FIG. 3 as a group of predictive data frames "P" traveling from the reader 221 to the network preparation module 226. In this manner, data from the A/V source 202 is continuously streamed across the network in parallel with the key frame generation process. This allows the encoder 224 of the key frame generation module 226 to be run only when a key frame is being generated, rather than full-time. This may save computing resources compared to running the encoder 224 on a full-time basis. Further, this also may help to preserve video quality compared to running the encoder 224 on a full-time basis, as the decode/encode step used when running the encoder 224 on a full-time basis may potentially lead to a loss of video quality, depending upon the encoding method used.

The key frame generation module 204 may be used to generate key frames in any suitable manner. As one illustrative example, upon receipt of a request for a fast-forward or rewind operation, the key frame generator 222 may examine every nth frame, with n defined by the fast-forward or rewind speed the user has selected (wherein n is larger for higher speeds), and generate a key frame that is representative of that frame. The resulting key frames may then be rendered by the presentation device at greater than 1× playback speed to deliver a fast-forward or rewind experience. As another illustrative example, upon request of a seek operation or after another such discontinuity in play, the key frame generator 222 may examine the frames preceding the seek point or discontinuity, and then create a key frame that can be used to seed the media decoder (shown at 212 in FIG. 2) in the media receiver.

Additionally, the key frame generation module 204 may also be used to transrate a media data stream. For example, the A/V control module 200 (or other module) may determine that the requested media stream has a bit rate that exceeds the bandwidth of the network link between the media server and the requesting media receiver (shown at 106 and 122, 126, respectively, in FIG. 1). In this case, the A/V control module may direct the key frame generation module 204 to generate new key frames, media sequences, or other media samples that require less bandwidth to deliver than the original video stream. In one specific example, selected segments of a media stream may be collapsed into a single key frame to reduce the bit-rate of the media stream. It will be understood that the specific implementations of real-time key frame generation described above are set forth for the purpose of example, and are not intended to be limiting in any manner.

Figure 4:
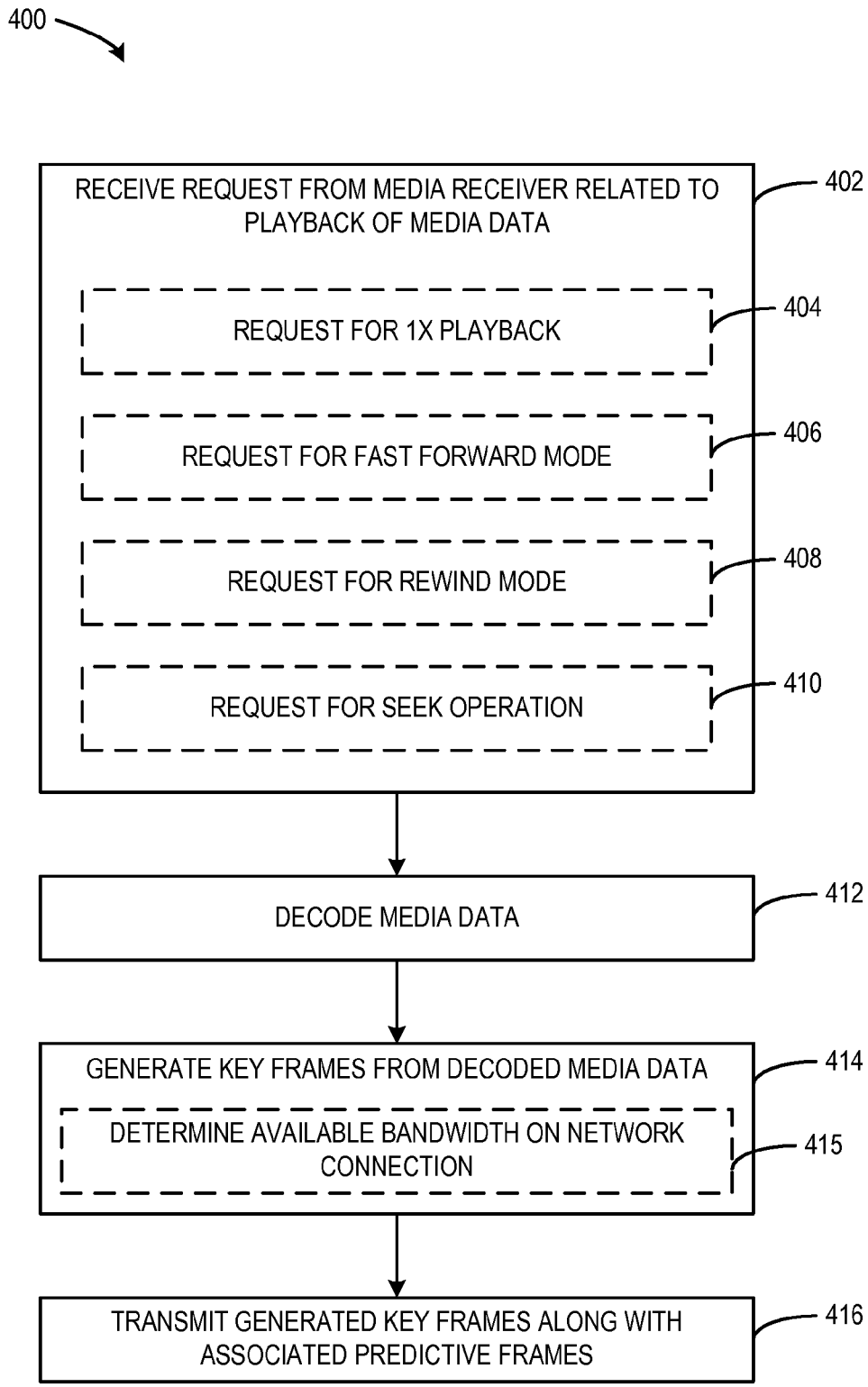
FIG. 4 shows a process flow of an embodiment of a method for generating key frames in streaming media in real time.

FIG. 4 shows a process flow depicting an embodiment of a method 400 of generating key frames in a media stream in real time. Method 400 may be used on any suitable streaming media device, including but not limited to media server 106 of FIG. 1, other media servers in other use environments, and/or peer devices in peer-to-peer use environments. Method 400 first comprises receiving a request from a media receiver to play back encoded media data (at 402). The request to play back of the encoded media data may request the data to be played in any of a number of ways. For example, the request may be a request to stream media data to the media receiver for 1× playback (as indicated at 404). Likewise, the request may be a request for playback in a trick mode, such as a request for playback in a fast-forward mode (as indicated at 406), for playback in a rewind mode (as indicated at 408), or for a seek operation (as indicated at 410). It will be appreciated that these specific requests are set forth for the purpose of example, and are not intended to be limiting in any sense.

Upon receipt of the request to play back encoded media, method 400 next comprises decoding the encoded media data (at 412), generating key frames from the encoded media data (at 414), and transmitting the generated key frames to the media receiver (at 416). Each of these steps may be performed in any suitable manner. For example, the media data may be decoded either continuously for the duration of the streaming of media to the media receiver, or only upon receipt of a request for trick-mode operation and during the duration of the trick mode operation. Continuous decoding may be utilized where multiple key frames are to be generated at regular intervals, for example, where it is desired to generate key frames for the proper playback of a media file having only predictive frames.

Continuous decoding may also be used for the duration of a fast-forward/rewind operation to generate a selected frequency of key frames for the purpose of enabling smooth rewind/fast-forward playback. Likewise, selective decoding may be used where it is desired to generate a key frame at a specific seek location or other discontinuity. It will be appreciated that these specific implementations are described for illustrative purposes, and that either continuous or selective decoding may be used in any suitable implementation. Further, it will be understood that even where selective decoding is used, the decoder may decode predictive frames for some length of time to develop sufficient context for the generation of a key frame.

Continuing with FIG. 4, key frames may be generated from the decoded media data and transmitted to the media receiver in any suitable manner. For example, as described above, key frames may be generated by encoding a selected frame of decoded data as an independent frame. In some embodiments, the encoder may run continuously, and may output both key frames and predictive frames. In these embodiments, the output of the encoder may be an encoded data stream having a higher density or frequency of key frames than the original data. In other embodiments, the encoder may be run only when a key frame is needed. In these embodiments the encoder may output only key frames, and the key frames may then be inserted in real-time into a stream of the original encoded data, as shown in FIG. 3.

Where key frames are generated in regular intervals (e.g. during rewind, fast-forward, or 1× playback modes), the key frames may be generated and transmitted at any suitable frequency. Suitable frequencies may include, but are not limited to, frequencies sufficiently high to produce a desired trick-mode playback experience while being sufficiently low not to exceed the bandwidth of the network link with the media receiver. Further, in some embodiments, the available bandwidth of the network link and/or the computing resources available optionally may be determined by A/V control module (shown at 200 in FIG. 2) and used to determine a key frame generation frequency, as shown in FIG. 4 at 415.

While described herein in the context of a home streaming media environment, it will be appreciated that the concepts disclosed herein may be used in any suitable streaming media environment, including but not limited to other client-sever-based use environments and peer-to-peer-based use environments. Furthermore, while the media server and media receiver are shown herein as being located on different devices, it will be understood that these components may comprise separate components, modules, programs or other entities running on a single device.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of processing encoded media data, the method comprising:
   receiving a request to play back the encoded media data, wherein the encoded media data is encoded in a format comprising key frames that are encoded without reference to other frames and predictive frames that are encoded with reference to other frames;
   decoding the encoded media data to form decoded media data;
   generating one or more generated key frames from the decoded media data;
   including the generated key frames in the encoded media data thereby increasing a number of key frames in the encoded media data; and
   sending the one or more generated key frames along with the encoded media data in response to the request.

2. The method of claim 1 wherein the decoding of the encoded media data and the generating of the one or more key frames from the decoded media data are performed during real-time streaming of the encoded media data to the media receiver.

3. The method of claim 1, wherein the request to play back the encoded media data is a request for playback of the encoded media data at 1× speed.

4. The method of claim 1, wherein the request to play back the encoded media data is a request for a fast-forward or rewind of the encoded media data.

5. The method of claim 1, wherein the request to play back the encoded media data is a request for a seek operation.

6. The method of claim 1, wherein sending the one or more generated key frames to the media receiver comprises sending the one or more generated key frames in place of a plurality of predictive frames to transrate the media stream.

7. The method of claim 1, wherein the format comprises one or more of MPEG-1, MPEG-2, MPEG-4, H.264, and WMV.

8. A method of providing encoded media data to a media receiver, the method comprising:
   receiving a request from the media receiver to play back the encoded media data in a trick mode, wherein the encoded media data comprises key frames that are encoded without reference to other frames and predictive frames that are encoded with reference to other frames;
   decoding the encoded media data to form decoded media data;
   generating one or more generated key frames from the decoded media data;
   inserting the one or more generated key frames into the encoded media data during streaming of the media data to the media receiver, thereby increasing a density of key frames in the encoded media data and transrating the encoded media data; and
   sending the encoded media data with the generated key frames to the media receiver for playback.

9. The method of claim 8, further comprising determining a bandwidth of a network connection to the media receiver and selecting a frequency at which to generate a plurality of generated key frames based upon the bandwidth.

10. The method of claim 8, wherein decoding the media data comprises continuously decoding the media data during streaming of the media data to the media receiver.

11. The method of claim 8, wherein decoding the media data comprises decoding only a selected portion of the media data during streaming of the media data to the media receiver.

12. The method of claim 8, wherein the request to play back the encoded media data is a request for playback at 1× speed.

13. The method of claim 8, wherein the request to play back the encoded media data is a request for playback in a fast-forward or rewind mode.

14. The method of claim 8, wherein the request to play back the encoded media data is a seek request.

15. A computing device, comprising:
  instructions stored on the computing device and executable by the computing device to receive a request from a media receiver to play back a stream of encoded media data provided to the media receiver by the computing device, wherein the encoded media data comprises key frames that are encoded without reference to other frames and predictive frames that are encoded with reference to other frames, to decode the encoded media data thereby forming decoded media data, to generate one or more generated key frames of media data from the decoded media data, to insert the one or more generated key frames into the encoded media data thereby increasing a density of key frames in the encoded media data, and to send the encoded media data with the one or more generated key frames to the media receiver.

16. The computing device of claim 15, wherein the instructions are executable to insert the one or more generated key frames into the stream of encoded media data, and to send the stream of encoded media data with the one or more generated key frames to the media receiver.

17. The computing device of claim 15, wherein the instructions are executable to re-encode the decoded media data with the one or more generated key frames to form re-encoded media data, and to send the re-encoded media data with the one or more generated key frames to the media receiver.

18. The computing device of claim 15, wherein the instructions are executable to decode the encoded media data and then encode the one or more generated key frames of media data upon receipt of one or more of a request for a playback at 1× speed, a request for a rewind operation, a request for a fast-forward operation, and a request for a seek operation.

19. The computing device of claim 18, wherein the instructions are executable to generate and transmit a single generated key frame upon receipt of a request for a seek operation.

20. The computing device of claim 18, wherein the instructions are executable to generate and transmit generated key frames at a regular interval upon receipt of a request for a fast-forward, rewind or 1× playback operation.

* * * * *